US008004716B2

(12) United States Patent
Tomaru

(10) Patent No.: US 8,004,716 B2
(45) Date of Patent: Aug. 23, 2011

(54) IMAGE FORMING APPARATUS THAT RESTRICTS PRINTING OF SPECIFIC INFORMATION

(75) Inventor: Masashi Tomaru, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1172 days.

(21) Appl. No.: 11/692,980

(22) Filed: Mar. 29, 2007

(65) Prior Publication Data

US 2007/0229898 A1 Oct. 4, 2007

(30) Foreign Application Priority Data

Mar. 30, 2006 (JP) ................................ 2006-095592

(51) Int. Cl.
*G06F 15/00* (2006.01)
*G06K 1/00* (2006.01)
*H04N 1/60* (2006.01)
*G06K 15/00* (2006.01)
*H04N 1/40* (2006.01)

(52) U.S. Cl. ....................................... 358/1.9; 358/3.28

(58) Field of Classification Search .................. 358/1.9, 358/1.13, 1.16, 1.14, 1.15
See application file for complete search history.

(56) References Cited

FOREIGN PATENT DOCUMENTS

| | | |
|---|---|---|
| JP | 2002-149638 | 5/2002 |
| JP | 2003-303063 | 10/2003 |
| JP | 2004-213376 | 7/2004 |
| JP | 2005-169672 | 6/2005 |

*Primary Examiner* — Douglas Q Tran
(74) *Attorney, Agent, or Firm* — Rabin & Berdo, PC

(57) ABSTRACT

The objective of the present invention is to provide an image forming apparatus that can print material by which specific information is not revealed without prohibiting printing, even where the printing data contains information that causes problems by printing specific information. By detecting information to be restricted in the printing data and restricting the image formation of the detected information, the image forming apparatus of the present invention can form the image in which the image of the information is not formed. Accordingly, the present invention provides an image forming apparatus that can print material by which specific information is not revealed without prohibiting printing, even where the printing data contains specific information.

11 Claims, 12 Drawing Sheets

| SPECIFIC INFORMATION DATABASE | | |
|---|---|---|
| NAME (FAMILY NAME) | ADDITIONAL INFORMATION 1 AFFILIATION | ADDITIONAL INFORMATION 2 PHONE NUMBER |
| NAME 1 | SALES (KANJI) | 03-AAAA-XXXX |
| NAME 2 | SALES (KANJI) | 03-BBBB-YYYY |
| NAME 3 | DEVELOPMENT (KANJI) | 03-CCCC-ZZZZ |
| ⋮ | ⋮ | ⋮ |

FIG. 3

| ADDITIONAL INFORMATION SEARCH TABLE |
|---|
| SALES |
| 03-AAAA-XXXX |
| DEVELOPMENT |
| 03-CCCC-ZZZZ |
| ⋮ |

FIG. 4

| PRINTING DATA | |
|---|---|
| DATA UNIT | COMMAND UNIT |
| SETTING DATA | SETTING COMMAND |
| ONE-BYTE CHARACTER DATA | CHARACTER COMMAND |
| TWO-BYTE CHARACTER DATA | CHARACTER COMMAND |
| DRAWING DATA | DRAWING COMMAND |
| IMAGE DATA | IMAGE COMMAND |
| TWO-BYTE CHARACTER DATA | CHARACTER COMMAND |
| ⋮ | ⋮ |

FIG. 6

| CHARACTER TYPE | FORMATION WITHIN THE DATA |
|---|---|
| ONE-BYTE CHARACTER | ASC II NOTATION |
| kobayashi | kobayashi |
| ***** | ***** |
| TWO-BYTE CHARACTER | CHARACTER CODE NOTATION |
| KOBAYASHI (KANJI) | 8FAC 97D1 |
| ＊ ＊ | 8196 8196 |

FIG. 7

2005. 11
FROM:KOBAYASHI
(KANJI)

NOTICE

THE END OF THE YEAR PARTY WILL BE HELD ON THE FOLLOWING DATE. WE HAVE TRIED TO ACCOMMODATE ALL PARTICIPANTS, AND HOPE THAT YOU ALL CAN ATTEND.

- ■ DATE : DECEMBER 30(MONDAY), FROM 6:30 PM
- ■ LOCATION : ### xx STREET, yy CITY
- ■ MAP : http://aaa.bbb.jp
- ■ COST : 3000 YEN

| PARTICIPANTS | | |
|---|---|---|
| NAME (FAMILY NAME) | AFFILIATION | CONTACT INFORMATION |
| KOBAYASHI (KANJI) | SALES (KANJI) | 03-AAAA-BBBB |
| KIMURA (KANJI) | SALES (KANJI) | 03-AAAA-BBBB |
| SATOU (KANJI) | DEVELOPMENT (KANJI) | 03-CCCC-DDDD |
| TAKAHASHI (KANJI) | DEVELOPMENT (KANJI) | 03-CCCC-DDDD |

FIG. 8

| SPECIFIC INFORMATION DATABASE | | |
|---|---|---|
| NAME (FAMILY NAME) | ADDITIONAL INFORMATION AFFILIATION | ADDITIONAL INFORMATION PHONE NUMBER |
| KOBAYASHI (KANJI) | SALES (KANJI) | 03−AAAA−BBBB |
| KIMURA (KANJI) | SALES (KANJI) | 03−AAAA−BBBB |
| SATOU (KANJI) | DEVELOPMENT (KANJI) | 03−CCCC−DDDD |
| TAKAHASHI (KANJI) | DEVELOPMENT (KANJI) | 03−CCCC−DDDD |

| SPECIFIC INFORMATION DATABASE | | | |
|---|---|---|---|
| NAME (FAMILY NAME) | ADDITIONAL INFORMATION 1 AFFILIATION | ADDITIONAL INFORMATION 2 PHONE NUMBER | SPECIFIC INFORMATION |
| NAME 1 | SALES (KANJI) | 03−AAAA−XXXX | @ |
| NAME 2 | SALES (KANJI) | 03−BBBB−YYYY | ADDRESS (KANJI) |
| NAME 3 | DEVELOPMENT (KANJI) | 03−CCCC−ZZZZ | |
| ⋮ | ⋮ | ⋮ | |

FIG. 16

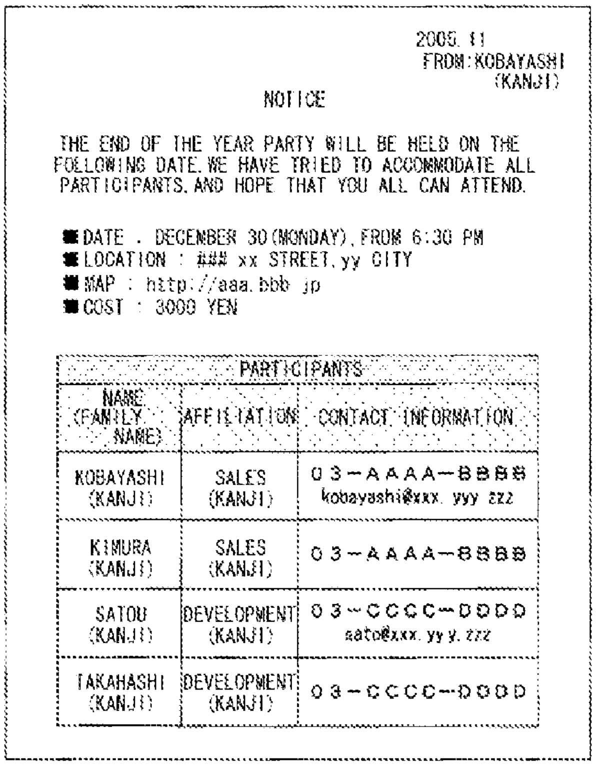

2005. 11
FROM:KOBAYASHI
(KANJI)

NOTICE

THE END OF THE YEAR PARTY WILL BE HELD ON THE FOLLOWING DATE. WE HAVE TRIED TO ACCOMMODATE ALL PARTICIPANTS, AND HOPE THAT YOU ALL CAN ATTEND.

- DATE : DECEMBER 30(MONDAY), FROM 6:30 PM
- LOCATION : ### xx STREET, yy CITY
- MAP : http://aaa.bbb.jp
- COST : 3000 YEN

| PARTICIPANTS | | |
|---|---|---|
| NAME (FAMILY NAME) | AFFILIATION | CONTACT INFORMATION |
| KOBAYASHI (KANJI) | SALES (KANJI) | 03-AAAA-BBBB kobayashi@xxx.yyy.zzz |
| KIMURA (KANJI) | SALES (KANJI) | 03-AAAA-BBBB |
| SATOU (KANJI) | DEVELOPMENT (KANJI) | 03-CCCC-DDDD sato@xxx.yyy.zzz |
| TAKAHASHI (KANJI) | DEVELOPMENT (KANJI) | 03-CCCC-DDDD |

FIG. 17

| SPECIFIC INFORMATION DATABASE | | | |
|---|---|---|---|
| NAME (FAMILY NAME) | ADDITIONAL INFORMATION AFFILIATION | ADDITIONAL INFORMATION PHONE NUMBER | SPECIFIC INFORMATION |
| KOBAYASHI (KANJI) | SALES (KANJI) | 03-AAAA-BBBB | @ |
| KIMURA (KANJI) | SALES (KANJI) | 03-AAAA-BBBB | ADDRESS (KANJI) |
| SATOU (KANJI) | DEVELOPMENT (KANJI) | 03-CCCC-DDDD | |
| TAKAHASHI (KANJI) | DEVELOPMENT (KANJI) | 03-CCCC-DDDD | |

FIG. 19

2005. 11
FROM:KOBAYASHI
(KANJI)

NOTICE

THE END OF THE YEAR PARTY WILL BE HELD ON THE FOLLOWING DATE. WE HAVE TRIED TO ACCOMMODATE ALL PARTICIPANTS, AND HOPE THAT YOU ALL CAN ATTEND.

■DATE : DECEMBER 30(MONDAY), FROM 6:30 PM
■LOCATION : ### xx STREET, yy CITY
■MAP : http://aaa.bbb.jp
■COST : 3000 YEN

| PARTICIPANTS | | |
|---|---|---|
| NAME (FAMILY NAME) | AFFILIATION | CONTACT INFORMATION |
| ** | ** | ************* ********************* |
| ** | ** | ************* |
| ** | ** | ************* ****************** |
| ** | ** | ************* |

IMAGE FORMING APPARATUS THAT RESTRICTS PRINTING OF SPECIFIC INFORMATION

BACKGROUND OF THE INVENTION

1. Field of the Invention

The present invention relates to an image forming apparatus restricting image formation of printing data that includes information such as personal information or specific information, possibly causing inconveniences by printing the specific information in a printed material.

2. Description of Related Art

Conventionally, because printing is executed without restricting printing data even where including specific information such as personal information, there are risks that the specific information could be divulged. Various techniques have been tried to prevent this problem, for example, cancellation of the printing process in a case where prohibited information is included in the printing data (for example, see Japanese Patent Application Publication 2005-169672).

In the image forming apparatus described in the above published patent gazette, however, in a case where printing data includes specific information prohibited from being printed, printing cannot be executed based on inclusion of this data, thereby raising a problem that that the user cannot receive the desired printed material.

It is an objective of the present invention, in consideration of the above situation, to provide an image forming apparatus that can print material by which specific information is not revealed without prohibiting printing, even where the printing data contains information that causes problems by printing specific information.

The image forming apparatus contains a reception unit for receiving printing data, a primary storage unit for storing the printing data received by the reception unit, a secondary storage unit for storing specific information included in the printing data, a specific information detection unit for detecting from the printing data stored in the primary storage unit the specific information stored in the secondary storage unit, an image formation unit for executing image formation based on the printing data stored in the primary storage unit, and a data processing unit for restricting the image formation of the specific information detected by the specific information detection unit.

Through the image forming apparatus of the present invention, the specific information to be restricted is stored in a secondary storage unit and a specific information detection unit detects the specific information. By restricting the image formation of the detected specific information, the image can be formed in which the image of the specific information is not formed. Accordingly, the image formation apparatus of the present invention provides an image forming apparatus that can print material by which specific information is not revealed without prohibiting printing, even where the printing data contains specific information.

Furthermore, the image forming apparatus contains a reception unit for receiving printing data, a primary storage unit for storing the printing data received by the reception unit, a secondary storage unit for storing specific information included in the printing data, a specific information detection unit for detecting from the printing data stored in the primary storage unit the specific information stored in the secondary storage unit, an image formation unit for executing image formation based on the printing data stored in the primary storage unit, and a data processing unit for restricting the image formation of printing data of a prescribed area in a range of the specific information detected by the specific information detection unit.

Through the image forming apparatus of the present invention, the specific information to be restricted is stored in a secondary storage unit and a specific information detection unit detects the specific information. By restricting the image formation of the detected specific information and the printing data of the prescribed area in the range of the specific information, the image can be formed in which the image of the specific information and the printing data of the prescribed area in the range of the specific information is not formed. Accordingly, the image formation apparatus of the present invention provides an image forming apparatus that can print material by which specific information and printing data of the prescribed area in the range of the specific information is not revealed without prohibiting printing, even where the printing data contains specific information.

By detecting information to be restricted in the printing data and restricting the image formation of the detected specific information, the image forming apparatus of the present invention can form the image in which the image of the specific information is not formed. Accordingly, the image formation apparatus of the present invention can print material by which specific information is not revealed without prohibiting printing, even where the printing data contains specific information.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein:

FIG. 3 is a diagram showing the additional information stored in an additional information search table of the image forming apparatus described in the first embodiment of the present invention;

FIG. 4 is a diagram showing the structure of the printing data;

FIG. 6 is a diagram showing a specific example of an expression of the printing data and character identification;

FIG. 7 is a diagram showing an example of printed material before image formation of the specific information and additional information is restricted as a specific example described in the first embodiment of the present invention;

FIG. 8 is a diagram showing an example of the specific information database used in the restriction of the image formation of the printed material of FIG. 7;

FIG. 16 is a diagram showing an example of printed material before image formation of the specific information, additional information, and character data of the printing data in the range of the specific information is restricted as a specific example described in the second embodiment of the present invention;

FIG. 17 is a diagram showing an example of the specific information database used in the restriction of the image formation of the printed material of FIG. 16;

FIG. 19 is a diagram showing the printed material in which the specific information, additional information, and character data of the printing data in the range of the specific information of the printed material of FIG. 7 is replaced with unreadable characters.

DESCRIPTION OF PREFERRED EMBODIMENTS

The following is a description of the image forming apparatus of the present invention, referencing diagrams. Furthermore, the image forming apparatus of the present embodiment is not restricted to the following descriptions, and can be arbitrarily altered without deviating from the general scope of the present invention.

First Embodiment

Figures 1, 2:
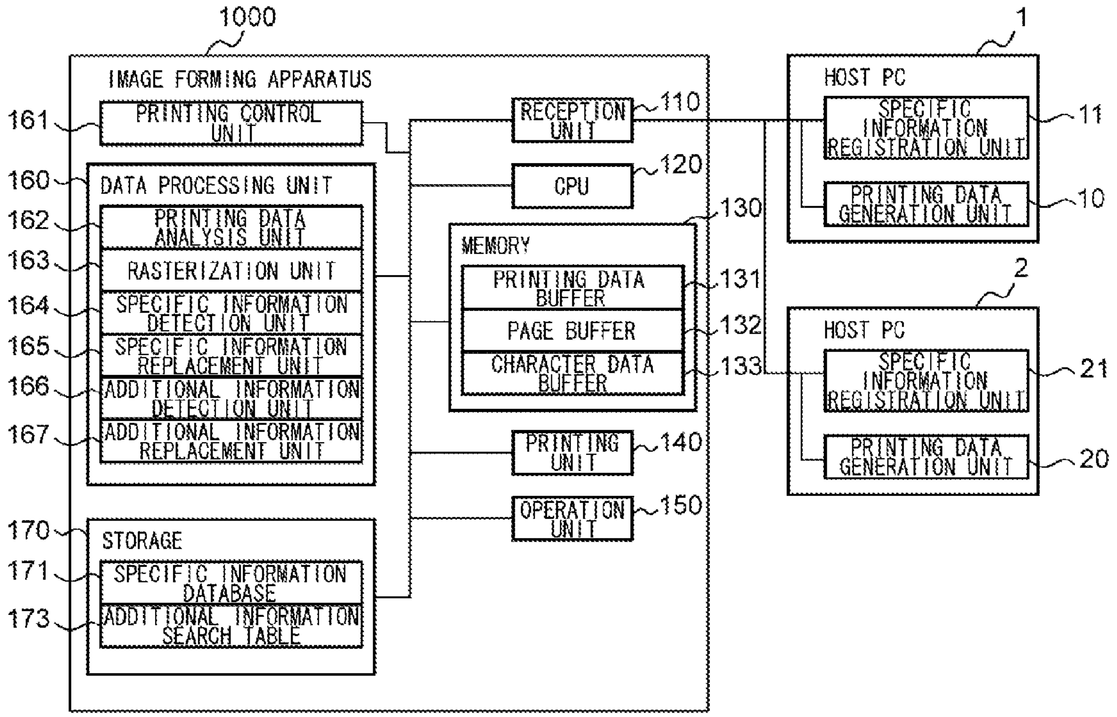
FIG. 1 is a diagram showing a structure of the image forming apparatus described in a first embodiment of the present invention.
FIG. 2 is a diagram showing the specific information and additional information stored in a specific information database of the image forming apparatus described in the first embodiment of the present invention.

FIG. 1 is a diagram showing the structure of the image forming apparatus of the present invention. The image forming apparatus 1000 of the present invention is connected to host PCs (Personal Computers) 1 and 2 via a LAN (Local Area Network) to create a network.

The image forming apparatus 1000 of the present invention is made up of a reception unit 110, a CPU (Central Processing Unit) 120, a memory 130 serving as a primary storage unit, a printing unit 140 serving as an image formation unit, an operation unit 150, a data processing unit 160, a printing control unit 161, and a storage 170 serving as a secondary storage unit.

The reception unit 110 receives the printing data generated by data generation units 10 and 20 of the host PCs 1 and 2. The received printing data undergoes various processes, described later, executed by the data processing unit 160 and is then printed on a prescribed medium by the printing unit 140. In addition, the reception unit 110 receives the specific information and additional information input by specific information registration units 11 and 21 of the host PCs 1 and 2.

The CPU 120 is made up of a microprocessor. The CPU 120 controls each unit of the data processing unit 160 and executes each process by executing various programs stored in a ROM (Read Only Memory), not shown. In addition, the CPU 120 panoptically controls the memory 130, the printing unit 140, the storage 170, and the like. That is, the CPU 120 executes overall control of the image forming apparatus 1000.

The memory 130 is made up of DRAMs (Dynamic Random Access Memories), SDRAMs (Synchronous DRAMs), and the like and is used as a temporary storage area for various programs to be executed. The memory 130 is made up of a printing data buffer 131, a page buffer 132, and a character data buffer 133.

The printing data buffer 131 stores the printing data received from the reception unit 110 in single page units. The page buffer 132 stores bitmap data that has been rasterized by a rasterization unit 163 with a size of at least one page. The printing unit 140, described later, acquires the bitmap data rasterized by the rasterization unit 163 from the page buffer 132, executes image formation of the bitmap data, and prints the image on the prescribed medium. The character data buffer 133 saves as a character string the character data extracted from the printing data stored in the printing data buffer 131.

The operation unit 150 contains a key panel, touch panel, or the like as an input section and also contains LEDs (Light-Emitting Diodes), LCD (Liquid Crystal Display), or the like as a display section. Various operation of the image forming apparatus 1000 can be executed via the CPU 120 using the operation unit 150.

The data processing apparatus 160 executes various processes and is controlled by various programs executed by the CPU 120. The data processing unit 160 contains a printing data analysis unit 162, the rasterization unit 163, a specific information detection unit 164, a specific information replacement unit 165, an additional information detection unit 166, and an additional information replacement unit 167.

The printing control unit 161 executes various processes and is controlled by various programs executed by the CPU 120. The printing control unit 161 reads from the page buffer 132 the bitmap data rasterized by the rasterization unit 163 and sends the bitmap data to the printing control unit 140. The printing control unit 161 then controls the printing unit 140 to execute image formation of the bitmap data. The printing data analysis unit 162 analyzes the printing data stored in the printing data buffer 131 in single command units and extracts the character data from the printing data. The printing data analysis unit 162 then stores the extracted character data as a character string in the character data buffer 133. The rasterization unit 163 rasterizes the printing data, converting it into bitmap data. The converted bitmap data is stored in the page buffer 132.

The specific information detection unit 164 detects the specific information from the printing data in the printing data buffer 131. The specific information is restricted to formed images of specific information linked to an identity of an individual, such as a name, for example. The specific information replacement unit 165 replaces printing data in a manner such that specific information detected by the specific information detection unit 164 is changed into unreadable characters, such as "*" (asterisk). The detection and replacement of the specific information is executed before rasterization by the rasterization unit 163.

The additional information detection unit 166 detects additional information from the printing data in the printing data buffer 133. The additional information restricted to formed images of information linked to the specific information, such as an address or phone number corresponding to the specific information, for example. The additional information replacement unit 167 replaces printing data in a manner such that additional information detected by the additional information detection unit 166 is changed into unreadable characters, such as "*". The detection and replacement of the additional information is executed before rasterization by the rasterization unit 163.

The storage 170 is a nonvolatile storage apparatus from which the data is not erased even where power to the apparatus is cut off, and is made up of a hard disk, flash memory, or the like. The storage 170 contains a specific information database 171 and an additional information search table 173.

As shown in FIG. 2, every piece of specific information and additional information linked to the specific information is stored in the specific information database 171. The specific information and additional information stored in the specific information database 171 are input to be stored in the database by the specific information registration units 11 and 21 of the host PCs 1 and 2, and are received by the reception unit 110 via the network.

As shown in FIG. 3, only the additional information linked to the specific information in the printing data detected by the specific information detection unit 164 is stored in the additional information search table 173.

The printing unit 140 acquires the bitmap data rasterized by the rasterization unit 163 from the page buffer 132 and executes printing on the prescribed medium.

For example, the printing unit 140 contains toner cartridges that hold yellow (Y), magenta (M), cyan (C), and black (K) toners and also contains photosensitive drums corresponding to each color, a transfer roller for transferring the toner image, and the like. The printing unit 140 forms an electrostatic latent image corresponding to the bitmap data stored in the page buffer 132 on the photosensitive drum through exposure, and, in addition to forming the toner image by developing the electrostatic latent image using toner, also transfers the toner image on the photosensitive drum to the prescribed medium. The toner image transferred to the medium is fused to the medium by thermal compression bonding or the like and the printed medium is then ejected by an ejection unit, not shown.

The printing unit 140 of the image forming apparatus 1000 of the present invention is not restricted to color electrophotographic printing, and may be used for various printing methods such as inkjet printing or the like.

The printing data sent to the image forming apparatus 1000 of the present invention is defined as page descriptive language (script language), which is multiple combinations of printer control commands represented by character strings. The control command is made up of a data unit and a command unit. The command unit contains, for example, a setting command, character command, drawing command, image command, and the like. As shown in FIG. 4, the data unit corresponds to each command of the command unit. For example, setting data corresponds to the setting command, one-byte character data and two-byte character data correspond to the character command, drawing data corresponds to the drawing command, and image data corresponds to the image command.

Figure 5:
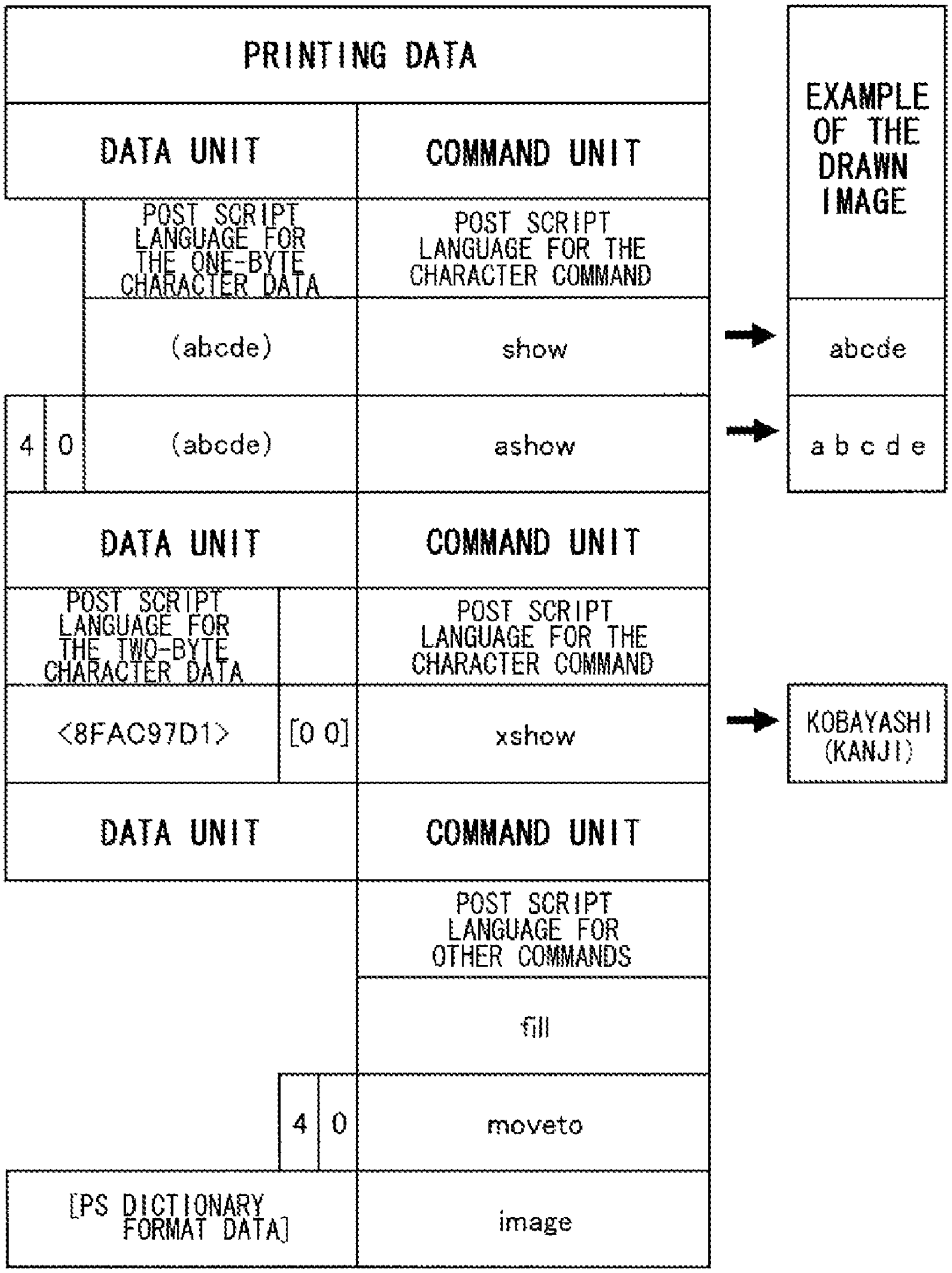
FIG. 5 is a diagram showing an example of the structure of the printing data written in PostScript (registered trademark: Adobe corporation)

The page descriptive language is explained referencing FIG. 5 and using PostScript (registered trademark: Adobe corporation) as an example. As the command for drawing the character, there is a "show" command for drawing the character string, an "ashow" command for adjusting a drawing space for drawing the character string, an "xshow" command for adjusting a drawing location for drawing the character string, as well as many other types of commands. In the command for drawing the character string, the character data to be drawn is included in data unit. For example, in a case where both commands "show" and "ashow" for drawing the character string include the character data "abcde", the "show" command draws "abcde" as "abcde", while the "ashow" command opens a space between the characters to draw "abcde" as "a b c d e". Furthermore, giving examples of other commands, the drawing command includes a "fill" command for designating filling in, the setting command includes a "moveto" command for designation a location, the image command includes an "image" command for drawing the image, and the like. The printing data defined by this type of page descriptive language is converted into bitmap data by the rasterization process of the rasterization unit 163 and is printed by the printing unit 140.

The character data of the one-byte character and the two-byte character is included in the command for drawing the character string. The one-byte character is a character that, by being drawn, is recorded as a half-width English character or a half-width number, and is described as it is in the printing data in the form a of a half-width English character or a half-sized number. For example, the characters "kobayashi", drawn with half-width English characters, are defined by ASCII code as the same "kobayashi" in the printing data. On the other hand, the two-byte character is a character that, by being drawn, is recorded as hiragana, katakana, kanji, full-width English character, or a full-width number, and is defined as code (code system shift-JIS) corresponding to the character in the printing data. For example, the characters drawn with the kanji "KOBAYASHI(Kanji)" are defined in the printing data as "8FAC 97D1" by the code system shift-JIS.

In a case where the specific information detection unit 164 or the additional information detection unit 166 described above detects the specific information or additional information in the printing data, the character data of the printing data is detected as the target. In a case where the specific information or additional information is detected in the printing data, the specific information replacement unit 165 or the additional information replacement unit 167 replaces the detected specific information or additional information with a previously designated character. For example, "*" can be used as the previously designated character. In such a case, if the detected personal information or additional information is a one-byte character, the printing data is replaced with printing data containing character data in which the half-width "*" corresponds to the character string. If the detected personal information or additional information is a two-byte character, the printing data is replaced with printing data containing the shift-JIS code "8196", which draws a full-width "*". That is, as shown in FIG. 6, in a case where the "kobayashi" made up of one-byte characters is detected, the specific information replacement unit 165 replaces the printing data including the ASCII code "kobayashi" with printing data containing character data of the ASCII code "*******". In a case where, for example, the "KOBAYASHI(Kanji)" is made up of two-byte characters is detected, the specific information replacement unit 165 replaces the printing data including the shift-JIS code "8FAC 97D1" corresponding to "KOBAYASHI (Kanji)" with printing data including the shift-JIS code "8196 8196" corresponding "" (KOBAYASHI is made up of two Kanji). When the printing data is replaced in this manner, the specific information is changed to the unreadable character "*" and therefore the image formation of specific information such as personal information can be restricted. The additional information can also be replaced with to the unreadable character "*" in the same manner.

The following is a description of the performance of the image forming apparatus 1000, referencing FIG. 1 through FIG. 7, using printing data with which printed material containing specific information and additional information as shown in FIG. 7 can be printed.

The specific information and additional information stored in the specific information database 171 is previously input through the specific information registration units 11 and 21 of the host PCs 1 and 2. The input specific information and additional information is received by the reception unit 110 of the image forming apparatus 1000 and stored in the specific information database 171. At this time, as shown in FIG. 8, each piece of specific information, which is the last name, and additional information, which is the affiliation and phone number, is stored in specific information database 171.

Figure 9:
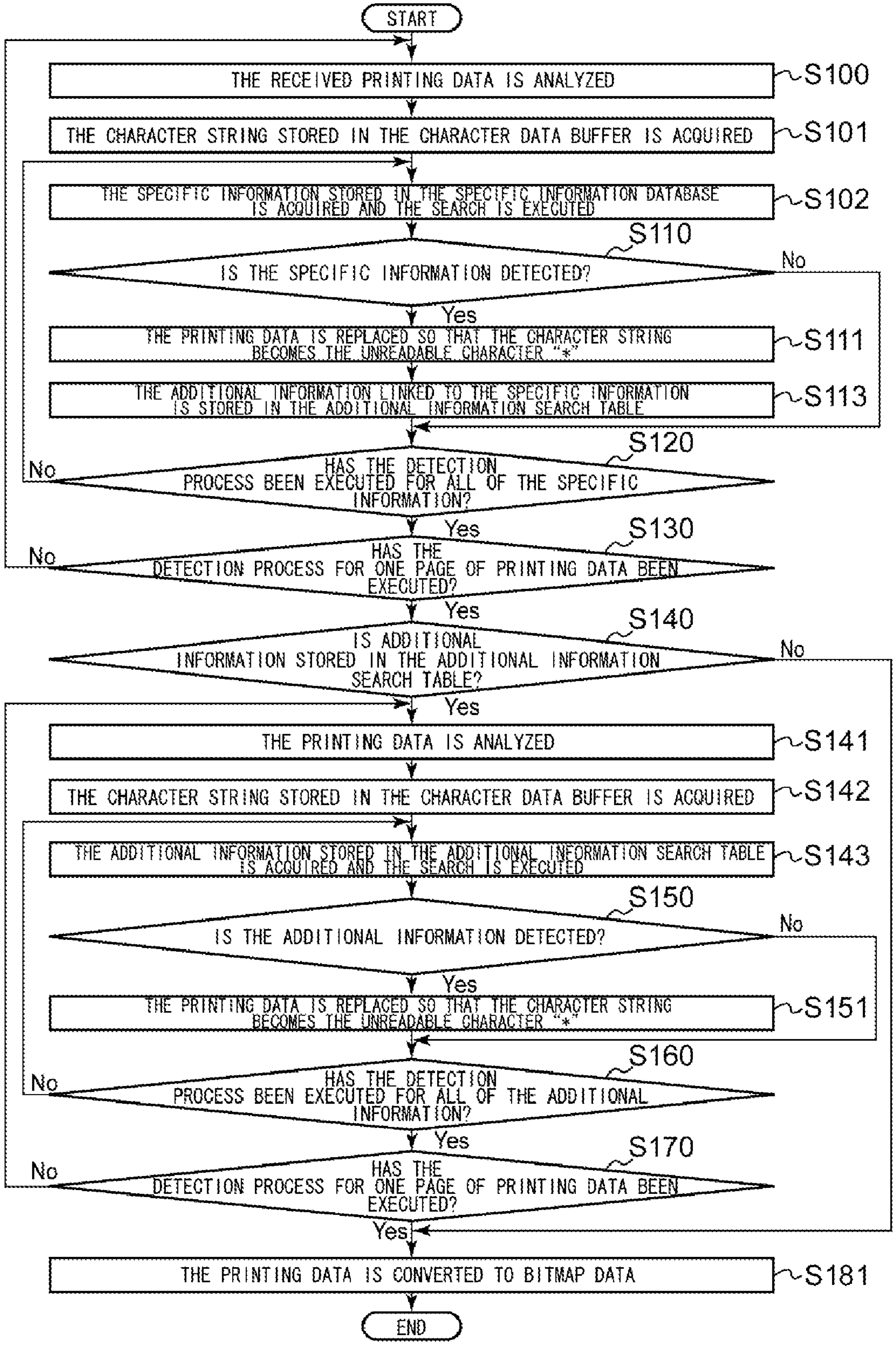
FIG. 9 is a flow chart showing the process relating to detection and replacement of the specific information and additional information executed by the image forming apparatus described in the first embodiment of the present invention.

The reception unit 110 of the image forming apparatus 1000 receives the printing data generated by the printing data generation units 10 and 20 of the host PCs 1 and 2. When the reception unit 110 receives the printing data, the CPU 120 controls the printing control unit 161 and each unit of the data processing unit 160 to execute each process shown in FIG. 9.

The received printing data is stored in the printing data buffer 131 that stores the printing data in single page units. By having single page units of the printing data stored in the printing data buffer 131, the printing data analysis unit 162, at step S100, can execute a printing data analysis process according to the flow chart shown in FIG. 10.

First, in the printing data by the printing data analysis process performed by the analysis unit 162, at step S200, one of the command units is acquired from the printing data stored in the printing data buffer.

Next, the printing data analysis unit 162 analyzes the acquired command unit. At this time, at step S210 the printing data analysis unit 162 determines whether the command unit is a character command. In a case where the result is that the command unit is not a character command, the printing data analysis unit 162 ends the received printing data analysis process.

At step S210, in a case where the command unit is a character command, the process moves on to step S211. At step S211, the printing data analysis unit 162 acquires the character data of the data unit corresponding to the command unit.

After acquiring the character data, at step S212, the printing data analysis unit 162 stores the character data as a character string in the character data buffer 133 and ends the process. The analysis of the printing data by the printing data analysis unit 162 is executed for every command.

After the printing data analysis process performed by the analysis unit 162, the specific information detection unit 164 executes the process for detecting the specific information from the printing data. At step S101, the specific information detection unit 164 receives notification that the character string was stored in the character data buffer 133 during the analysis process by the printing data analysis unit 162 and then acquires the character string stored in the character data buffer 133. For example, in a case where the character string "KOBAYASHI(Kanji)" corresponding to the character data "8FAC 97D1" is stored in the character data buffer 133 from printing data that, according to the printing data analysis unit 162, can print such printed material as shown in FIG. 7, the specific information detection unit 164 acquires the character string "KOBAYASHI(Kanji)".

After acquiring the character string, at step S102, the specific information detection unit 164 sequentially acquires the specific information stored in the specific information database 171 and searches for whether the acquired specific information is included in the character string. For example, in a case of the database shown in FIG. 8, the family names "KOBAYASHI(Kanji)", "KIMURA(Kanji)", "SATOU (Kanji)", and "TAKAHASHI(Kanji)", which are the specific information, are sequentially acquired one at a time by the specific information detection unit 164 and the search is then performed.

After searching with one piece of acquired specific information, at step S110, in a case where the specific information is not included in the character string, the process moves on to step S120. In a case where the specific information is included in the character string, the process moves on to step S111.

In a case where the result of the search at step S102 is that the specific information is detected in the character string, the specific information detection unit 164 notifies the specific information replacement unit 165 that specific information has been detected in the character string. Upon receiving notification that specific information has been detected in the character string, the specific information replacement unit 165 executes the process to replace the printing data containing this character string to restrict the image formation of specific information. At step S111, the specific information replacement unit 165 replaces the printing data in a manner such that the character data of the printing data containing the detected character string is changed to the unreadable character "*". For example, in the case of the printed material of FIG. 7, by detecting in the character string acquired from the character data buffer 131 the specific information "KOBAYASHI(Kanji)" acquired from the specific information database 171, the specific information replacement unit 165 replaces the character data "8FAC 97D1" in the printing data corresponding to "KOBAYASHI(Kanji)" with "8196 8196". In addition, the above example shows a case where the number of characters of the detected specific information is the same as the number of characters of the character string of the printing data, but in a different case, such as a case where the number of characters of the character string of the printing data is greater, all of the characters in the printing data can be replaced with the unreadable character "*" (code 8189h). For example, in a case where the character string of the printing data is "KOBAYASHI ISSA(Kanji)", the name is replaced with "*****" (KOBAYASHI and ISSA are two Kanji each).

At step S113, the specific information detection unit 164 acquires from the specific information database 171 only the additional information linked to the detected specific information and stores the acquired additional information in the additional information search table 173. For example, in a case of the printed material of FIG. 7, because the specific information "KOBAYASHI(Kanji)" is detected from the character string by the specific information detection unit 164, the only the phone number "03-AAAA-BBBB" and the affiliation "SALES(Kanji)" linked to "KOBAYASHI(Kanji)" are acquired from the specific information database 171 of FIG. 8 and are then stored in the additional information search table 173.

After storage, at step S120, the specific information detection unit 164 determines whether the detection process has been executed for all of the specific information stored in the specific information database 171. In a case where the detection process has not been executed for all of the specific information, the process moves on to step S112 and the detection process of the next piece of specific information is executed.

At step S120, in a case where the detection process has been executed for all of the specific information, the specific information detection unit 164 notifies the printing data analysis unit 162 that the detection process is finished. The printing data analysis unit 162 then determines whether character data not stored in the character data buffer 133 is present in the single page unit of printing data stored in the printing data buffer 131 and, at step S130, the printing data analysis unit 162 makes a judgment as to whether the detection process for the single page unit of the printing data has been completed.

In a case where the printing data analysis unit 162 makes a judgment that the detection process for the single page unit of the printing data is not yet executed, the process moves to step S100 and the printing data analysis unit 162 continues the printing data analysis process. On the other hand, in a case where the printing data analysis unit 162 makes a judgment that the detection process for the single page unit of the printing data has been executed, the printing data analysis unit 162 notifies the additional information detection unit 166 that the specific information detection process has been executed and the process moves on to step S140.

Upon reception of the notification that the specific information detection process has been executed, the additional information detection unit 166, at step S140, determines whether the additional information is stored in the additional information search table 173. A case where the additional information is not stored in the additional information search table 173 indicates that the specific information was not detected in the printing data or that the additional information is not linked to the detected specific information. In such a case, the process moves on to step S181 without executing the detection process and the replacement process. At this time, the additional information detection unit 173 notifies the rasterization unit 163 that the additional information is not stored in the additional information search table 173.

At step S140, in a case where the additional information is stored in the additional information search table 173, the additional information detection unit 166 informs the printing data analysis unit 162 that the additional information is stored. The printing data analysis unit 162 receives the notification that the additional information is stored and, at step S141, executes process to analyze the printing data of FIG. 10 to detect the additional information. This printing data analysis process is the same as the process of step S100 and therefore the description is omitted.

After the printing data analysis process executed by the printing data analysis unit 162, the additional information detection unit 166 executes the process to detect the additional information from the printing data. At step S142, the additional information detection unit 166 receives notification that the character string was stored in the character data buffer 133 during the analysis process by the printing data analysis unit 162 and then acquires the character string stored in the character data buffer 133. For example, in a case where the character string "SALES(Kanji)" is stored in the character data buffer 133 from printing data that, according to the printing data analysis unit 162, can print such printed material as shown in FIG. 7, the specific additional detection unit 166 acquires the character string "SALES(Kanji)".

After the character string is acquired, at step S143, the additional information detection unit 166 sequentially acquires the additional information stored in the additional information search table 173 and searches for whether the acquired additional information is included in the character string. For example, in the case of the printed material of FIG. 7, the pieces of additional information "SALES(Kanji)", "03-AAAA-BBBB", "DEVELOPMENT(Kanji)", and "03-CCCC-DDDD" are sequentially acquired one at a time by the additional information detection unit 166 and the search is then performed.

After searching with one piece of acquired additional information, at step S150, in a case where the additional information is not included in the character string, the process moves on to step S160. In a case where the additional information is included in the character string, the process moves on to step S151.

In a case where the result of the search at step S143 is that the additional information is detected in the character string, the additional information detection unit 166 notifies the additional information replacement unit 167 that additional information has been detected in the character string. Upon receiving notification that additional information has been detected in the character string, the additional information replacement unit 167 executes the process to replace the printing data containing this character string to restrict the image formation of additional information. At step S151, the additional information replacement unit 167 replaces the printing data in a manner such that the character data of the printing data containing the detected character string is changed to the unreadable character "*". For example, in the case of the printed material of FIG. 7, by detecting in the character string "SALES(Kanji)" acquired from the character data buffer 131 as additional information acquired from the additional information search table 173, the additional information replacement unit 167 replaces the character data "SALES(Kanji)" in the printing data with "8196 8196" ("SALES(Kanji)" contains two Kanji).

Next, at step S160, the additional information detection unit 166 determines whether the detection process has been performed for all of the additional information stored in the additional information search table 173. In a case where the detection process has not been executed for all of the additional information the process moves on to step S143 and the detection process of the next piece of additional information is executed.

At step S160, in a case where the detection process has been executed for all of the additional information, the additional information detection unit 166 notifies the printing data analysis unit that the detection process is finished. The printing data analysis unit 162 then determines whether character data not stored in the character data buffer 133 is present in the single page unit of printing data stored in the printing data buffer 131 and, at step S170, the printing data analysis unit 162 makes a judgment as to whether the detection process for the single page unit of the printing data has been completed.

In a case where the printing data analysis unit 162 makes a judgment that the detection process for the single page unit of the printing data is not yet executed, the process moves to step S141 and the printing data analysis unit 162 continues the printing data analysis process. On the other hand, in a case where the printing data analysis unit 162 makes a judgment that the detection process for the single page unit of the printing data has been executed, the printing data analysis unit 162 notifies the rasterization unit 163 that the additional information detection process has been executed and the process moves on to step S181.

Upon receiving notification that the additional information detection process has been executed or that the additional information is not stored in the additional information search table 173, the rasterization unit 163 executes the rasterization process for the replaced printing data. At step S181, the rasterization unit 163 reads the printing data, on which the aforementioned various processes are performed, of the printing data buffer 133, analyzes the page descriptive language of the printing data, and converts the printing data into bitmap data by which the printing unit 140 can execute image formation.

The rasterization unit 163 stores the converted bitmap data in single page units in the page buffer 132. At this time, the rasterization unit 163 notifies the printing control unit 161 that the bitmap data is stored in the page buffer 132. Upon receiving this notification, the printing control unit 161 reads the bitmap data from the page buffer 132 and sends the data to the printing unit 140, after which the printing unit 140 executes image formation of the bitmap data.

Figure 11:
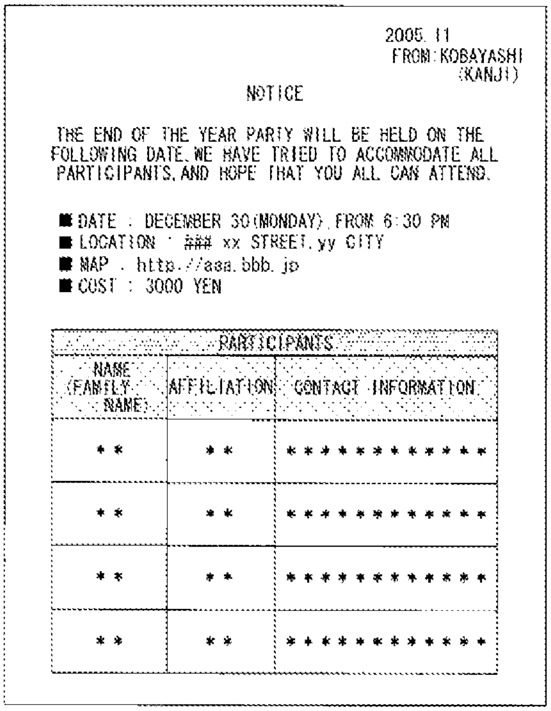
FIG. 11 is a diagram showing the printed material in which the specific information and additional information of the printed material of FIG. 7 is replaced with unreadable characters.

For example, in the case of the printed material of FIG. 7, the printing data is changed through the aforementioned replacement process in a manner such that the specific information "KOBAYASHI(Kanji)", "KIMURA(Kanji)", "SATOU(Kanji)", and "TAKAHASHI(Kanji)" and the additional information "SALES(Kanji)", "03-AAAA-BBBB", "DEVELOPMENT(Kanji)", and "03-CCCC-DDDD" is replaced with the unreadable character "*". The rasterization unit 163 then rasterizes the replaced printing data, converting it into bitmap data. The converted bitmap data is stored in the page buffer 132 and the printing unit 140 executes image formation of this bitmap data. Through this image formation, the printed material such as that shown in FIG. 11 in which the specific information and additional information is replaced with the unreadable character "*" can be printed.

In the manner described above, the image forming apparatus 1000 of the present invention stores in the specific information database 171 the specific information and additional information to be restricted in the formed image, detects the specific information with the specific information detection unit 164, and detects the additional information with the additional information detection unit 166. By restricting the image formation of the detected specific information and additional information, an image can be formed in which the specific information and additional information is restricted. That is, the image forming apparatus 1000 of the present invention can provide printed material by which specific information and additional information is not revealed, without prohibiting the printing of printing data containing specific information and additional information.

The specific information replacement unit 165 and the additional information replacement unit 167 replace the printing data in a manner such that the image is formed in which the specific information and additional information is changed to unreadable characters. By converting the replaced printing data into bitmap data and printing with the printing unit 140, the printed material can be printed in which the specific information and additional information is represented as unreadable characters. Therefore, along with hiding the specific information and additional information, it is understood that the portions having the unreadable characters contain the specific information or additional information.

Furthermore, in a case where specific information is detect in the printing data, the image forming apparatus 1000 of the present invention stores the additional information linked to this specific information in the additional information search table 173, so that only the additional information stored in the additional information search table 173 is detected by the additional information detection unit 167. Therefore, it is necessary to detect only the additional information linked to the detected specific information, so that, in comparison to detecting all of the specific information and additional information together, the time required for the detection process can be shortened.

In addition, in the first embodiment, an example is shown in which the printing data is represented by the page descriptive language, the specific information is detected from a target character string within a character string printing command of this language, and an the image formation of this information is restricted, but in a case where the printing data is bitmap data, for example, the character string can be identified by performing an OCR (Optical Character Reader) process for this bitmap data and the specific information may then be detected within the identified character string. In a case where the specific information is detected, by being structured in a manner to identify an area of the printing data in which the specific information is detected and replace the bitmap data of this area with blacked-out data, printed material in which the specific information is restricted can be achieved in the same manner.

Regardless of the data format of the printing data, printed material in which image formation of the specific information is restricted can be achieved by performing the OCR process for the bitmap data in the page buffer 132.

In the first embodiment, a name was given as an example of the specific information and an affiliation and a phone number were given as examples of the additional information, but the present invention is not restricted to this. For example, the specific information or additional information may be a home address, age, gender, birthday, phone number, nationality, ethnicity, registered address, personal background, birthplace, family tree, relationship, family status, family business, personal workplace, family workplace, workplace department, workplace employee number, type of work, position, educational history, employment history, marital status, height, weight, blood type, blood pressure, physical ability, language, regional dialect, sexual orientation, hobby, personal taste, skill, goal, property, income, amount of tax paid, bank, business client address, credit card number, location, building, home size and construction, faith, religion, political party, tax number, e-mail address, or the like.

In the first embodiment, the printing data was replaced to print in a manner such that the specific information is changed to the unreadable character "*", but the printing data may also be replaced in a manner such that the specific information is changed into a blank space or any other characters or symbols, as long as the printing data removes the detected specific information.

In the first embodiment, in a case where the number of characters in the character string of the printing data is greater than the number of characters in the specific information, all of the characters of the printing data are replaced with the unreadable character "*" (code 8189h), but it is also possible to change only the character string corresponding to the specific information or additional information in the character string of the printing data into the unreadable character "*".

Second Embodiment

The image forming apparatus 1000 of the second embodiment can detect prescribed specific information and restrict the image formation of printing data within the area of the prescribed specific information. The following is a detailed description of the image forming apparatus 1000 of the second embodiment, referencing diagrams. The description of parts of the second embodiment that are identical to those of the first embodiment is omitted.

Figures 12, 13:
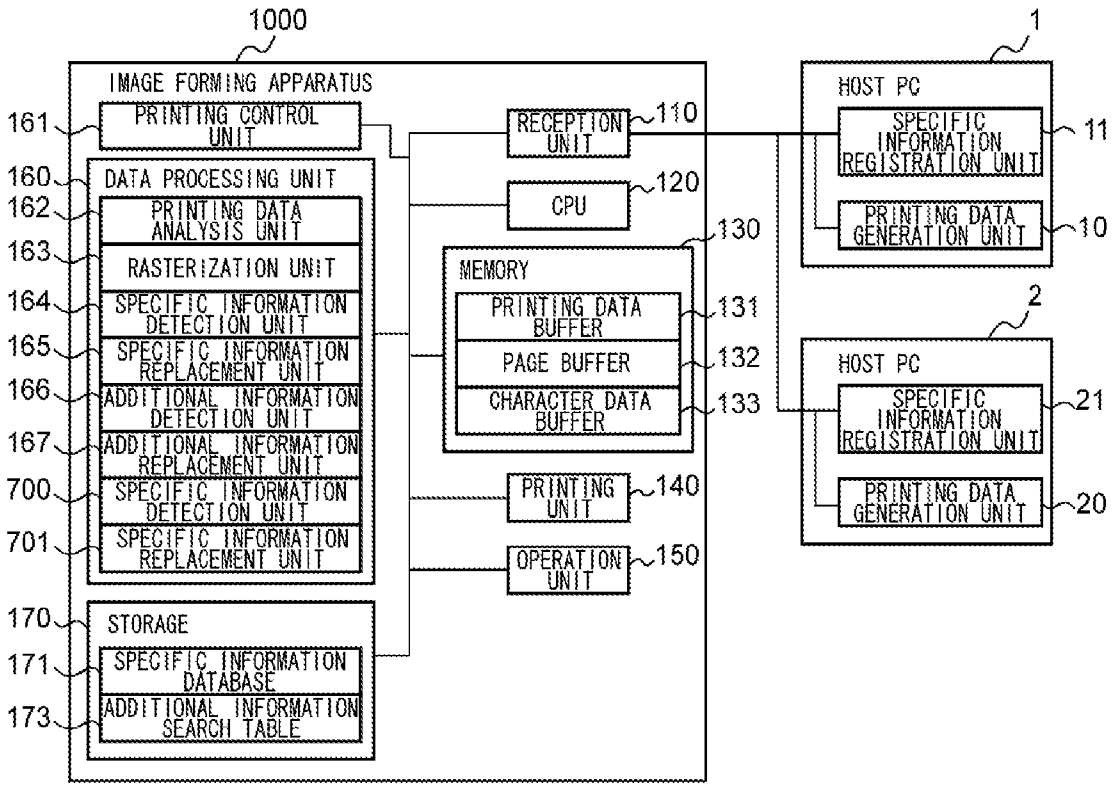
FIG. 12 is a diagram showing the structure of the image forming apparatus described in a second embodiment of the present invention.
FIG. 13 is a diagram showing the specific information and additional information stored in a specific information database of the image forming apparatus described in the second embodiment of the present invention.

As shown in FIG. 12, the information processing unit 160 of the image forming apparatus 1000 contains a specific information detection unit 700 and a specific information replacement unit 701. The specific information detection unit 700 detects the specific information from the printing data in the printing data buffer. This specific information is any arbitrary character and is restricted in the image formation along with the printing data of the prescribed area in a range of the specific information. The "@" in an e-mail address will be used as an example. Upon detection of the "@" from the printing data, image formation of the e-mail address is restricted. This prescribed area, centered around the specific information, is the range of the printing data restricted from image formation and can be arbitrarily determined. For example, the printing data that includes one piece of character data in front of and behind the specific information may be set as the prescribed area. Furthermore, the range may alter depending on the specific information. The following description is given with the prescribed area set as the printing data that includes one piece of character data in front of and behind the specific information. The specific information replacement unit 701 replaces the printing data in a manner to change the printing data of the specific information detected by the specific information detection unit 700 and the prescribed area in the range of the specific information to, for example, the unreadable character "*". The detection and replacement of the specific information is executed before rasterization by the rasterization unit 163.

As shown in FIG. 13, specific information such as the e-mail "@" and "ADDRESS(Kanji)", as well as the specific information and the additional information linked to the specific information, is stored in the specific information database 171 serving as the primary storage unit. The specific information such as the e-mail "@" and "ADDRESS(Kanji)" is not detected like the additional information in a manner such that the detection process is executed according to the specific information, but rather is detected in the same manner as the specific information.

Figure 14:
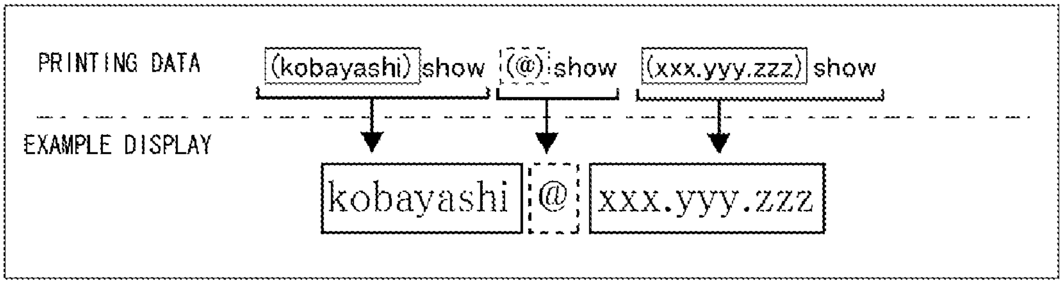
FIG. 14 is a diagram showing the specific data and character data of the printing data in a range of the specific data set as a detection target of the specific information detection unit in the image forming apparatus described in the second embodiment of the present invention.

The printing data containing the specific information stored in the specific information database 171 is described using an e-mail address as an example. The printing data containing this specific information is also written in page descriptive language. As shown in FIG. 14, the printing data of the e-mail address because the character data "kobayashi", "@", and "xxx.yyy.zzz" is included in the "show" command, this printing data forms the image "kobayashi@xxx.yyy.zzz". By saving the specific information "@" in the specific information database 171, not only is image formation of the "@" restricted, but image formation of the character data "kobayashi" and "xxx.yyy.zzz", which is in the range of the "@", is also restricted.

Figure 15:
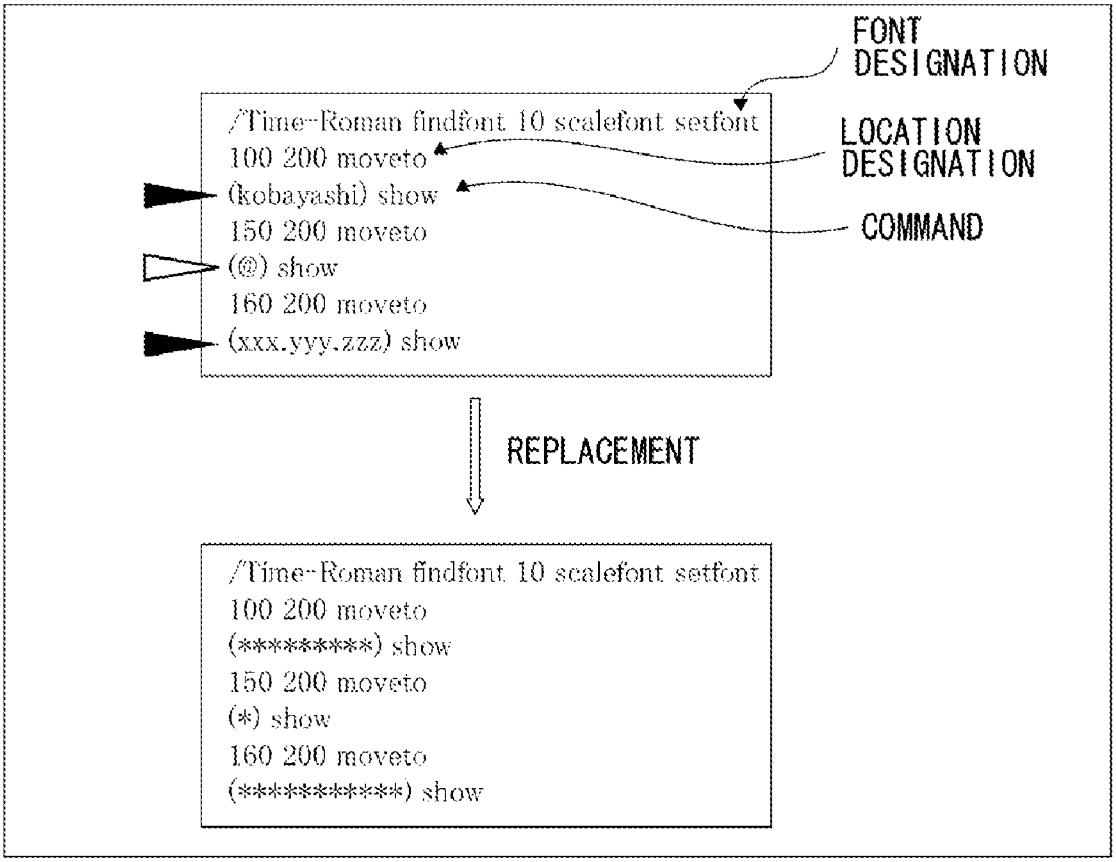
FIG. 15 is a diagram showing a condition before and after the specific information and the printing data in the range of the specific information is replaced by the specific information replacement unit of the image forming apparatus described in the second embodiment of the present invention.

Specifically, as shown in FIG. 15, when the specific information detection unit 700 detects the "@" in the printing data, the specific information replacement unit 701 replaces the printing data including the "@" with printing data including the "*". The specific information detection unit 700 then detects the character data "kobayashi" and "xxx.yyy.zzz" from within the printing data that includes the character data in front of and behind the "@". The specific information replacement unit 701 then replaces all of the character data of the aforementioned printing data with "*". When the printing data is replaced, the specific information is changed to the unreadable character "*", thereby restricting the image formation of printing data of the prescribed area within the range of the specific information.

The following is a description of the performance of the image forming apparatus 1000, referencing FIG. 16 through FIG. 19, using printing data with which printed material containing specific information, additional information, and specific information such as "@" as shown in FIG. 16 can be printed.

The specific information, additional information, and specific information such as "@" stored in the specific information database 171 is previously input through the specific information registration units 11 and 21 of the host PCs 1 and 2. The input specific information, additional information, and specific information such as "@" is received by the reception unit 110 of the image forming apparatus 1000 and stored in the specific information database 171. At this time, as shown in FIG. 17, each piece of specific information, which is the last name, the additional information, which is the affiliation and phone number, and the specific information such as "@", which is "@" and "ADDRESS(Kanji)", is stored in specific information database 171.

Figure 18:
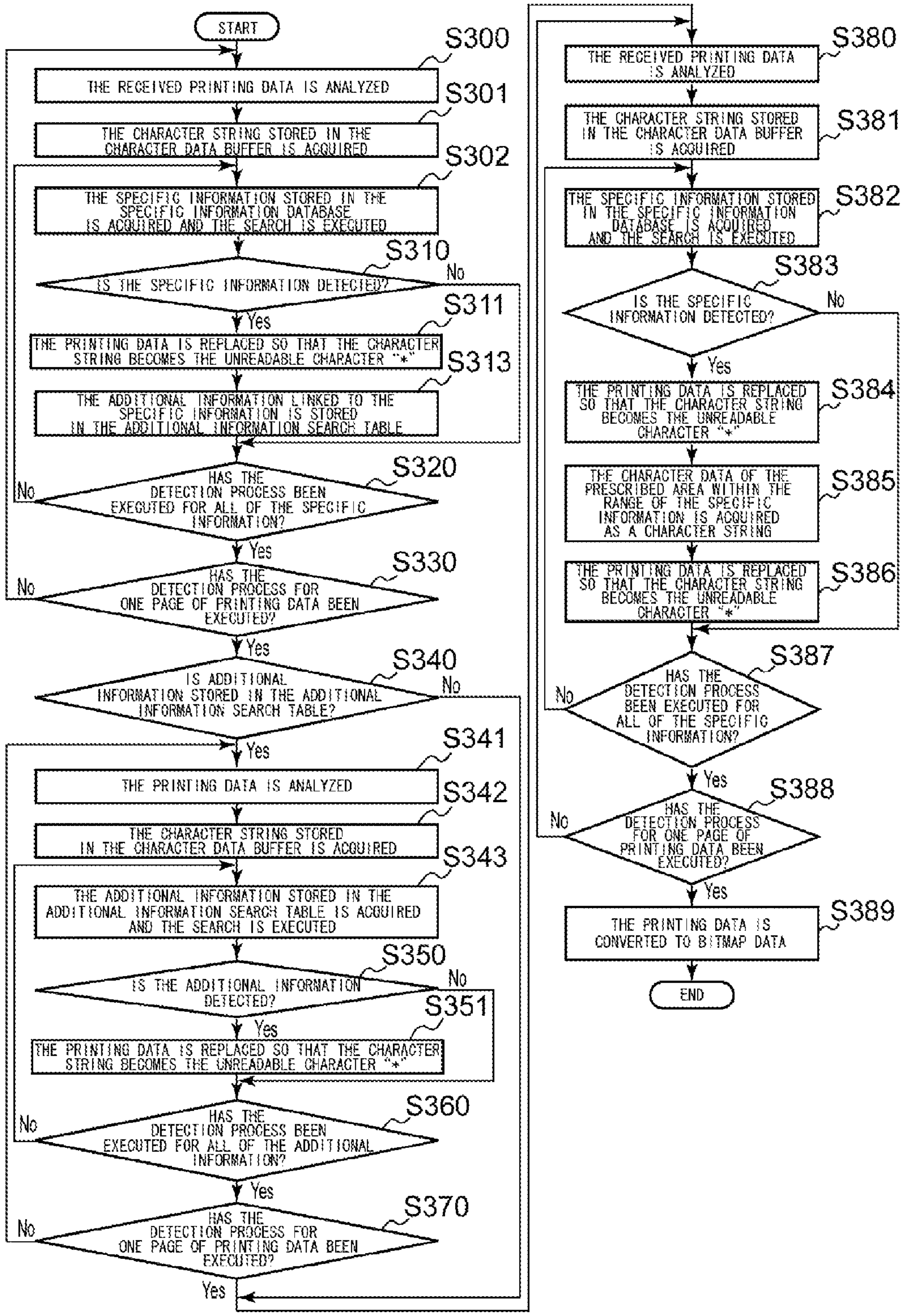
FIG. 18 is a flow chart showing the process relating to detection and replacement of the specific information, additional information, and character data of the printing data in the range of the specific information executed by the image forming apparatus described in the second embodiment of the present invention.

The reception unit 110 of the image forming apparatus 1000 receives the printing data generated by the printing data generation units 10 and 20 of the host PCs 1 and 2. When the reception unit 110 receives the printing data, the CPU 120 controls the printing control unit 161 and each unit of the data processing unit 160 to execute each process shown in FIG. 18. In addition, steps S300 through S370 shown in FIG. 18, are the same as steps S100 through S170 shown in FIG. 9 of the first embodiment, and therefore the explanation is omitted.

At step S370, the printing data analysis unit 162 makes a judgment as to whether the detection process for a single page of printing data has been executed. In a case where the printing data analysis unit 162 makes a judgment that the detection process for a single page of printing data has not yet been executed, the process moves to step S341 and the printing data analysis unit 162 continues the process of analyzing the printing data.

Figure 10:
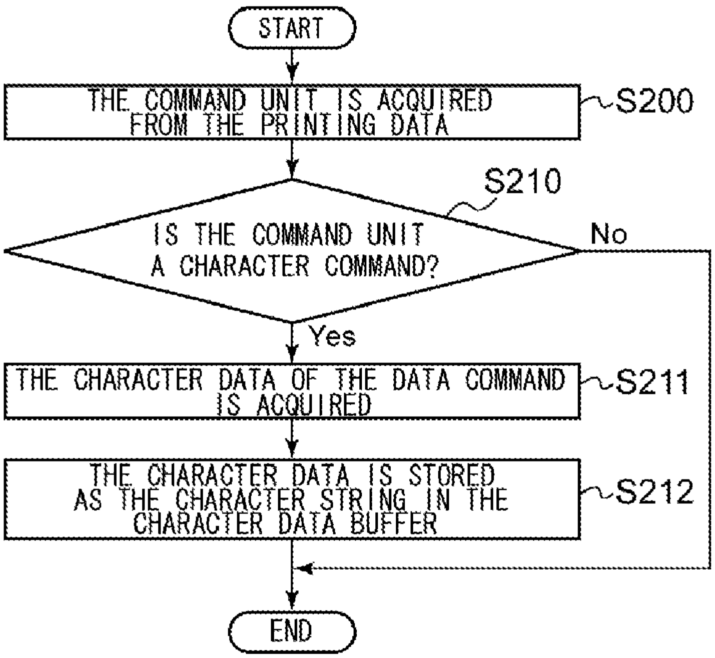
FIG. 10 is a flow chart showing the process of analyzing the printing data performed by a printing data analysis unit of the image forming apparatus of the first embodiment of the present invention.

On the other hand, in a case where the printing data analysis unit 162 makes a judgment that the detection process for a single page of printing data has been completed, the printing data analysis unit 162, at step S380, executes the process of analyzing the printing data of FIG. 10 to detect the specific information such as "@". The analysis of the printing data is the same process that is executed at step S100 of FIG. 9 and therefore the explanation is omitted.

After the analysis of the printing data by the printing data analysis unit 162, the specific information detection unit 700 executes the process to detect the specific information such as "@" from the printing data. At step S381, the specific information detection unit 700 receives notification that the character string was stored in the character data buffer 133 during the analysis process by the printing data analysis unit 162 and then acquires the character string stored in the character data buffer 133. For example, in a case where the character string "@" is stored in the character data buffer 133 from printing data that, according to the printing data analysis unit 162, can print such printed material as shown in FIG. 16, the specific information detection unit 700 acquires the character string "@".

After acquiring the character string, at step S382, the specific information detection unit 700 sequentially acquires the specific information stored in the specific information database 171 and searches for whether the acquired specific information is included in the character string. For example, in a case of the database shown in FIG. 17, the pieces of specific information "@" and "ADDRESS(Kanji)" are sequentially acquired one at a time by the specific information detection unit 700 and the search is then performed.

After searching with one piece of acquired specific information, at step S383, in a case where the specific information is not included in the character string, the process moves on to step S387. In a case where the specific information is included in the character string, the process moves on to step S384.

In a case where the result of the search at step S383 is that the specific information is detected in the character string, the specific information detection unit 700 notifies the specific information replacement unit 701 that specific information has been detected in the character string. Upon receiving notification that specific information has been detected in the character string, the specific information replacement unit 701 executes the process to replace the printing data containing this character string to restrict the image formation of the specific information. At step S384, the specific information replacement unit 700 replaces the printing data in a manner such that the character data of the printing data containing the detected character string is changed to the unreadable character "*". For example, in the case of the printed material of FIG. 16, by detecting in the character string acquired from the character data buffer 131 the specific information "@" acquired from the specific information database 171, the specific information replacement unit 701 replaces the character data of the printing data corresponding to "@" with "*".

At step S385, the specific information detection unit 700 detects the character data included in the printing data of the area within the range of the detected character string. For example, in the case of the printed material of FIG. 16, the specific information detection unit 700 detects "kobayashi" and "xxx.yyy.zzz" included in the printing data of the area within the range of the character string "@", which is the detected specific information. The specific information detection unit 700 notifies the specific information replacement unit 701 that character data of the printing data within the range of the specific information is detected.

Upon receiving notification that the character data is detected, the specific information replacement unit 701, at step S386, replaces the printing data in a manner such that the detected character data is changed to the unreadable character "*". For example, in the case of the printed material of FIG. 16, by detecting "kobayashi" and "xxx.yyy.zzz" included in the printing data of the area within the range of the character string "@" acquired from the character buffer 133, the specific information replacement unit 701 replaces the character data of the printing data corresponding to "kobayashi" and "xxx.yyy.zzz" with the unreadable character "*".

Next, at step S387, the specific information detection unit 700 determines whether the detection process has been executed for all of the specific information stored in the specific information database 171. In a case where the detection process has not been executed for all of the specific information, the process moves on to step S382 and the detection process of the next piece of specific information is executed.

At step S387, in a case where the detection process has been executed for all of the specific information, the specific information detection unit 700 notifies the printing data analysis unit 162 that the detection process is finished. The printing data analysis unit 162 then determines whether character data not stored in the character data buffer 133 is present in the single page unit of printing data stored in the printing data buffer 131 and, at step S388, the printing data analysis unit 162 makes a judgment as to whether the detection process for the single page unit of the printing data has been completed.

In a case where the printing data analysis unit 162 makes a judgment that the detection process for the single page unit of the printing data is not yet executed, the process moves to step S380 and the printing data analysis unit 162 continues the printing data analysis process. On the other hand, in a case where the printing data analysis unit 162 makes a judgment that the detection process for the single page unit of the printing data has been executed, the printing data analysis unit 162 notifies the additional rasterization unit 163 that the specific information detection process has been finished and the process moves on to step S389.

Upon receiving notification that the specific information detection process has been finished, the rasterization unit 163 executes the rasterization process for the replaced printing data. At step S389, the rasterization unit 163 reads the printing data, on which the aforementioned various processes are performed, of the printing data buffer 133, analyzes the page descriptive language of the printing data, and converts the printing data into bitmap data by which the printing unit 140 can execute image formation. In the same manner as in the first embodiment, the converted bitmap data is sent to the printing unit 140 and the printing unit 140 executes image formation of the bitmap data.

For example, in the case of the printed material of FIG. 16, the printing data is changed through the aforementioned replacement process in a manner such that the specific information "KOBAYASHI(Kanji)", "KIMURA(Kanji)", "SATOU(Kanji)", and "TAKAHASHI(Kanji)", the additional information "SALES(Kanji)", "03-AAAA-BBBB", "DEVELOPMENT(Kanji)", and "03-CCCC-DDDD", the specific information "@", and "kobayashi" and "xxx.yyy.zzz" of the printing data of the area in the range of the specific information "@" is replaced with the unreadable character "*". The rasterization unit 163 then rasterizes the replaced printing data, converting it into bitmap data. The converted bitmap data is stored in the page buffer 132 and the printing unit 140 executes image formation of this bitmap data. Through this image formation, the printed material such as that shown in FIG. 19 in which the specific information, additional information, and specific information such as "@" is replaced with the unreadable character "*" can be printed.

In the manner described above, the image forming apparatus 1000 of the present invention stores in the specific information database 171 the specific information to be restricted in the formed image and detects the specific information with the specific information detection unit 700. By restricting the image formation of the detected specific information and the printing data of the prescribed area within the range of the specific information, an image can be formed in which the specific information and the printing data of the prescribed area within the range of the specific information is restricted. That is, the image forming apparatus 1000 of the present invention can provide printed material by which specific information and the printing data of the prescribed area within the range of the specific information is not revealed, without prohibiting the printing of printing data containing the prescribed specific information.

The specific information replacement unit 701 replaces the printing data in a manner such that the image is formed in which the specific information and the printing data of the prescribed area within the range of the specific information is changed to unreadable characters. By converting the replaced printing data into bitmap data and printing with the printing unit 140, the printed material can be printed in which the specific information and printing data of the prescribed area within the range of the specific information is represented as unreadable characters. For example, even in the case of printing the printed material in which information including the "@" of the e-mail address is printed, the e-mail address can be hidden without the necessity of inputting all of the letters that are desired to be hidden in the specific information database 171. Therefore, along with hiding specific information and printing data of the prescribed area within the range of the specific information, it is understood that the portions having the unreadable characters contain the specific information or additional information.

In the second embodiment, "@" and "address" were given as examples of the specific information, but restriction of the image formation of the printing data of the area within in the range of the specific information can be executed using various other keywords such as "age", "gender", "date of birth", "phone number", "nationality", "ethnicity", "birthplace", "family", "relationship", "business", "workplace", "department", "workplace employee number", "type of work", "location", "position", "educational history", "rewards or punishments", "medical history", "surgical history", "height", "weight", "blood type", "language", "hobby", "skill", "property", income", "tax amount", "bank", "number", or the like as the specific information.

The second embodiment gives an example in which the specific information is detected from the printing data, the printing data containing the character data in front of and behind the detected specific information is set as the prescribed range, and image formation of the specific information and the character data in the prescribed range is not executed, but the present invention is not limited to this. For example, restriction of the image formation may be executed in a manner such that the sentence structure is analyzed at the time of printing and the prescribed area is set to target the printing data including character data corresponding to the characters in a prescribed area in a horizontal direction, vertical direction, or both directions from the location corresponding to the specific information.

Furthermore, in the second embodiment, the image formation of specific information is restricted, but the image formation of the printing data containing the character data in front of and behind the specific information may be restricted without restricting the image formation of the specific information. For example, in the case of the e-mail address, the printing data may be replaced in a manner such that the specific information "@" remains as is while the character strings in front of and behind the "@" are changed to the unreadable character "*".

The present invention is not limited to the printer described in the aforementioned embodiments, and can be applied to a multifunctional device having the functions of a copy machine, fax machine, scanner, or the like. Furthermore, the present invention is not limited to devices for printing printed material such as the printer, and can also be applied to a device that outputs to a monitor.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image forming apparatus comprising:

a reception unit for receiving printing data;

a primary storage unit for storing the printing data received by said reception unit;

a secondary storage unit for storing specific information included in the printing data;

a specific information detection unit for detecting, from the printing data stored in said primary storage unit, the specific information stored in said secondary storage unit;

an image formation unit for executing image formation based on the printing data stored in said primary storage unit; and a data processing unit for restricting the image formation of the specific information detected by said specific information detection unit on a prescribed medium by replacing the specification information with prescribed data.

2. The image forming apparatus according to claim 1, wherein said data processing unit contains a specific information replacement unit for replacing the specific information detected by said specific information detection unit with the prescribed printing data.

3. The image forming apparatus according to claim 1, wherein the specific information is personal information.

4. The image forming apparatus according to claim 1, wherein said specific information detection unit detects the specific information from character data in the printing data.

5. The image forming apparatus according to claim 1, wherein said secondary storage unit also stores additional information linked to the specific information, said image forming apparatus further comprises an additional information detection unit for detecting from the printing data stored in said primary storage unit the additional information linked to the detected specific information upon detection of the specific information by said specific information detection unit, and wherein said data processing unit restricts image formation of the additional information detected by said additional information detection unit.

6. The image forming apparatus according to claim 5, wherein said data processing unit contains an additional information replacement unit for replacing the additional information detected by said additional information detection unit with the prescribed printing data.

7. The image forming apparatus according to claim 5, wherein the additional information is personal information.

8. The image forming apparatus according to claim 5, wherein said additional information detection unit detects the additional information from the character data in the printing data.

9. An image forming apparatus comprising:

a reception unit for receiving printing data;

a primary storage unit for storing the printing data received by said reception unit;

a secondary storage unit for storing specific information included in the printing data;

a specific information detection unit for detecting, from the printing data stored in said primary storage unit, the specific information stored in said secondary storage unit;

an image formation unit for executing image formation based on the printing data stored in said primary storage unit; and a data processing unit for restricting the image formation of the printing data of a prescribed area around the specific information detected by said specific information detection unit on a prescribed medium by replacing the printing data of the prescribed area around the specific information with prescribed data.

10. The image forming apparatus according to claim 9, wherein said data processing unit contains an information area replacement unit for replacing the printing data of the prescribed area around the specific information detected by the specific information detection unit with the prescribed printing data.

11. The image forming apparatus according to claim 9, wherein the printing data of the prescribed area around the specific information is character information.

* * * * *